(12) United States Patent
Oderkerk et al.

(10) Patent No.: US 11,685,840 B2
(45) Date of Patent: Jun. 27, 2023

(54) RUBBER REPLACEMENT MATERIAL COMPRISING TERPOLYMERS

(71) Applicant: Borealis AG, Vienna (AT)

(72) Inventors: Jeroen Oderkerk, Stenungsund (SE); Jari-Jussi Ruskeeniemi, Porvoo (FI); Oscar Prieto, Gothenburg (SE); Stefan Hellström, Kungälv (SE); Tanja Piel, Linz (AT); Daniela Mileva, Pichling (AT)

(73) Assignee: BOREALIS AG, Vienna (AT)

( * ) Notice: Subject to any disclaimer, the term of this patent is extended or adjusted under 35 U.S.C. 154(b) by 268 days.

(21) Appl. No.: 16/644,537

(22) PCT Filed: Oct. 11, 2018

(86) PCT No.: PCT/IB2018/001152
§ 371 (c)(1),
(2) Date: Mar. 5, 2020

(87) PCT Pub. No.: WO2019/086948
PCT Pub. Date: May 9, 2019

(65) Prior Publication Data
US 2020/0308324 A1 Oct. 1, 2020

(30) Foreign Application Priority Data
Oct. 11, 2017 (EP) .................................... 17195944

(51) Int. Cl.
| | | |
|---|---|---|
| C08F 210/02 | (2006.01) | |
| C08F 220/14 | (2006.01) | |
| C08F 4/16 | (2006.01) | |
| E04D 1/20 | (2006.01) | |
| A43B 13/04 | (2006.01) | |
| C09D 123/08 | (2006.01) | |
| B29C 48/00 | (2019.01) | |
| B29K 23/00 | (2006.01) | |
| C08K 5/00 | (2006.01) | |

(52) U.S. Cl.
CPC ........ C09D 123/0892 (2013.01); A43B 13/04 (2013.01); C08F 4/16 (2013.01); C08F 210/02 (2013.01); C08F 220/14 (2013.01); E04D 1/20 (2013.01); B29C 48/022 (2019.02); B29K 2023/08 (2013.01); C08K 5/005 (2013.01); C08K 5/0025 (2013.01)

(58) Field of Classification Search
CPC ........ C08F 210/02; C08F 220/14; C08F 4/16; C08K 5/0025; E04D 1/20; A43B 13/04
See application file for complete search history.

(56) References Cited

U.S. PATENT DOCUMENTS

2012/0059101 A1 3/2012 Arno et al.

FOREIGN PATENT DOCUMENTS

| | | |
|---|---|---|
| EA | 017846 B1 | 10/2009 |
| EA | 018278 B1 | 12/2010 |
| EA | 018406 B1 | 12/2010 |
| EA | 015093 B1 | 6/2011 |
| EP | 2144301 A1 | 7/2008 |
| KR | 20140139064 A | 12/2014 |
| RU | 2266917 C2 | 3/2005 |
| RU | 2489449 C2 | 8/2013 |
| RU | 2516544 C2 | 5/2014 |
| WO | WO 2000/068314 | 11/2000 |
| WO | 2006084355 A1 | 8/2006 |
| WO | 2007/137757 A1 | 6/2007 |
| WO | WO-2007137757 A1 * | 12/2007 ............. C08J 3/226 |
| WO | WO 2016/041946 A1 | 3/2016 |
| WO | 00/68314 | 11/2020 |

OTHER PUBLICATIONS

Basov N. I. et al. Quality control of polymeric materials. Ed. by Braginsky V. A., 2nd ed., revised, Leningrad, Publishing house "Chemistry", 1990, 112 pages.
International Search Report for PCT/EP2018/001152, dated Jun. 4, 2019.

* cited by examiner

Primary Examiner — Robert D Harlan
(74) Attorney, Agent, or Firm — Lippes Mathias LLP

(57) ABSTRACT

The present invention provides a polyolefin composition, said composition comprising a terpolymer comprising a cross-linkable polyolefin comprising hydrolysable silane groups and a polar comonomer, the polyolefin composition further comprising a cross-linking catalyst and a silicon containing compound. The polar comonomer Is present in an amount of 5-35 wt %.

20 Claims, No Drawings

RUBBER REPLACEMENT MATERIAL COMPRISING TERPOLYMERS

This is a 371 of PCT/IB2018/001152, filed Oct. 11, 2018, which claims priority to European Patent Application No. 17195944.8, filed Oct. 11, 2017, the contents of which are fully incorporated herein by reference.

TECHNICAL FIELD

The present invention relates to a polyolefin composition comprising a terpolymer comprising a cross-linkable polyolefin comprising hydrolysable silane groups and a polar comonomer, a cross-linking catalyst and a silicon-containing compound. Further, the present invention relates to a method of manufacturing a weather seal comprising the polyolefin composition, and to the weather seal comprising the polyolefin composition. Still further, the present invention relates to a method of manufacturing a roofing membrane comprising the polyolefin composition, and to the roofing membrane comprising the polyolefin composition.

Furthermore, the present invention relates to a method of manufacturing a shoe sole comprising the polyolefin composition, and to the shoe sole comprising the polyolefin composition. Finally, the present invention relates to a method of manufacturing a hose comprising the polyolefin composition, and to the hose comprising the polyolefin composition.

BACKGROUND OF THE INVENTION

EPDM (ethylene propylene diene monomer rubber) is the most commonly used rubber in sealing applications. EPDM is a very versatile material, since a typical EPDM compound may consist of more than 15 ingredients. However, handling and processing of EPDM requires many steps and is labor- and energy-intensive process. This is one of the reasons for increased interest for polyolefin-based materials having rubber properties. Soft, cross-linkable polymers can indeed be used in many applications instead of EPDM or other classical rubbers.

In order to achieve controlled crosslinking of polyolefins, a polyolefin grafted with silanes may be used as starting material, followed by crosslinking using condensation catalyst. Obtaining a grafted polyolefin is a two-step process, wherein the plastomer is polymerized in a first processing step and grafted in a second processing step. Another option for obtaining silane-derivatized polyolefin is using radical polymerization of ethylene and vinyl silane, wherein the silane functionality is formed already in the polymerization step, thus making the process time- and cost-efficient. Further, radically polymerized material has improved storage stability, since there is no "spacer" between the main chain and the silane groups, which prohibits hydrolysis of the ester group by moisture.

Hardness of a material may be defined as a material's resistance to indentation. Shore A is one of several measures of the hardness of a material. The higher the Shore A value, the harder the material. Commonly used sealing materials in automotive or building industry have Shore A of approximately 70. The lower the original Shore A is, the more fillers or other materials can be added for obtaining the final mixture. In order to decrease Shore A in ethylene-vinyl silane copolymers a third comonomer, e.g. acrylate can be used.

Elasticity is one of the most important properties in rubber-like. It is normally measured as compression set at different temperatures. The lower the compression set, the better the elasticity.

WO2016/041946 discloses a polymer composition comprising a polymer of ethylene with a comonomer having silane group(s) containing units and an additive that is an organic compound with at least one amine moiety. The inventive composition shows an extremely slow cross-linking of silane group(s) at ambient temperatures, and very efficient crosslinking at elevated temperatures.

EP2841493 describes a flame retardant polymer composition comprising a crosslinkable terpolymer comprising ethylene monomer units, a silane group containing comonomer units and comonomer units comprising a polar group; a metal carbonate filler and a silicone fluid or gum.

WO2000/068314 describes an elastomeric polymer composition comprising a crosslinkable ethylene-alkyl (meth) acrylate-unsaturated silane terpolymer that has an alkyl (meth)acrylate content of more than 5 mole % and an $MFR_2$ at 190° C., determined according to ISO 1133, Condition D, of at least 0.1 g/10 min. After having been crosslinked, the composition has a hot set, determined according to IEC-811, of less than 400%.

WO2012/046456 discloses an encapsulating material for solar cell containing an ethylene/alpha-olefin copolymer satisfying the following requirements (a1) to (a4): (a1) the content ratio of structural units derived from ethylene is from 80 to 90 mol % and the content ratio of structural units derived from alpha-olefin having 3 to 20 carbon atoms is from 10 to 20 mol %; (a2) MFR is from 10 to 50 g/10 minutes as measured under the conditions of a temperature of 190 degrees centigrade and a load of 2.16 kg in accordance with ASTM D1238; (a3) the density is from 0.865 to 0.884 g/cm3 as measured in accordance with ASTM D1505; and (a4) the shore A hardness is from 60 to 85 as measured in accordance with ASTM D2240.

Therefore, there is a need for material to be used in sealing applications, combining high elasticity and low to medium Shore A values. The material should further be cross-linkable at ambient temperatures and/or have fast cross-linking speed at elevated temperatures.

SUMMARY OF THE INVENTION

The present invention relates to a polyolefin composition, the composition comprising:
a terpolymer comprising
(A) a cross-linkable polyolefin comprising hydrolysable silane groups, and
(C) a polar comonomer,
wherein the polar comonomer (C) is present in an amount of 5-35 wt % based on the total amount of the terpolymer,
wherein the polyolefin composition further comprises:
(B) a cross-linking catalyst, and
(D) a silicon containing compound.

The silicon-containing compound (D) used in the composition of the present invention has the general formula

 (I)

wherein
$R^1$, which may be the same or different if more than one such group is present, is a monofunctional, or, if m=2, is a bifunctional, hydrocarbyl residue comprising from 1 to 100 carbon atoms;

$R^2$, which may be the same or different if more than one such group is present, is a hydrocarbyloxy residue comprising from 1 to 100 carbon atoms;

$R^3$ is —$R^4SiR^1_pR^2_q$, wherein p is 0 to 3, preferably 0 to 2, q is 0 to 3, preferably 1 to 3, with the proviso that p+q is 3, and $R^4$ is —$(CH_2)_rY_s(CH_2)_t$— where r and t independently are 1 to 3, s is 0 or 1 and Y is a difunctional heteroatomic group selected from —O—, —S—, —SO—, —SO2-, —NH—, —$NR^1$— or —$PR^1$—, where $R^1$ and $R^2$ are as previously defined; and x is 0 to 3, y is 1 to 4, z is 0 or 1, with the proviso that x+y+z=4;

and m=1 or 2.

Preferably, the silicon-containing compound (D) has a high compatibility with the polyolefin composition of the invention which means that even after treatment of the composition at elevated temperature for several hours the major part of the silicon-containing compound (D) does not volatize from the composition. The compatibility of compound (D) can be adjusted by appropriate selection of, especially, group $R^1$, which should be chosen sufficiently large and non-polar.

More particularly, the silicon-containing compound (D), preferably, is compatible with the composition insofar as it, when having been present in the composition in an initial amount corresponding to 0.060 mole hydrolysable groups per 1000 g composition, after a storage at 60° C. for 74 h in air is still present in the composition at least in an amount corresponding to 0.035 mole hydrolysable groups per 1000 g composition.

In formula (I) for compound (D), $R^1$, which may be the same or different if more than one such group is present, may be an alkyl, arylalkyl, alkylaryl or aryl group containing 1 to 40 carbon atoms, with the proviso that if more than one R1 group is present the total number of carbon atoms of the $R_1$ groups is at most 60. Further, $R^1$, which may be the same or different if more than one such group is present, may be a linear or branched C6- to C22-alkyl, preferably is a C8- to C20-alkyl group.

Furthermore, in formula (I) for compound (D), $R^2$, which may be the same or different if more than one such group is present, may be an alkoxy, aryloxy, alkylaryloxy, or arylalkyloxy group containing 1 to 15 carbon atoms, with the proviso that if more than one $R^2$ group is present the total number of carbon atoms in the alkyl moieties of the $R^2$ groups is at most 40. $R^2$, which may be the same or different if more than one such group is present, may be a linear or branched C1- to C10-alkoxy, more preferably is a C1- to C8-alkoxy, still more preferably a C1- to C4-alkoxy, and most preferably is a methoxy, ethoxy, propoxy, or 1-butoxy group.

The alkyl moieties of $R^1$ and $R^2$ may be linear or branched. R1 and R2 may comprise heteroatom substituents, however, preferably, $R^1$ and $R^2$ are free of any heteroatom The polyolefin composition of the invention preferably comprises compound (D) in an amount of from 0.001 to 3 wt % of the total composition, more preferably in an amount of from 0.01 to 2.5 wt % of the total composition.

The silicon-containing compound (D) may be added to the polyolefin composition in neat form, as a masterbatch, wherein the compound (D) is dispersed in a polymer matrix or via a masterbatch comprising the cross-linking catalyst (B).

The silicon-containing compound (D) may act as a scorch retarder.

The cross-linking catalyst (B) of the polyolefin composition may be a Brönsted acid, i.e. is a substance which acts as a proton donor. Such Brönsted acids may comprise inorganic acids such as sulphuric acid and hydrochloric acid, and organic acids such as citric acid, stearic acid, acetic acid, sulphonic acid and alkanoic acids as dodecanoic acid, or a precursor of any of the compounds mentioned. Preferably, the Brönsted acid is a sulphonic acid, more preferably an organic sulphonic acid.

Still more preferably, the Brönsted acid is an organic sulphonic acid comprising 10 C-atoms or more, more preferably 12 C-atoms or more, and most preferably 14 C-atoms or more, the sulphonic acid further comprising at least one aromatic group which may e.g. be a benzene, naphthalene, phenantrene or anthracene group. In the organic sulphonic acid, one, two or more sulphonic acid groups may be present, and the sulphonic acid group(s) may either be attached to a non-aromatic, or preferably to an aromatic group, of the organic sulphonic acid.

Further preferred, the aromatic organic sulphonic acid comprises the structural element:

$$Ar(SO_3H)_x \qquad (II)$$

with Ar being an aryl group which may be substituted or non-substituted, and x being at least 1.

The organic aromatic sulphonic acid cross-linking catalyst may comprise the structural unit according to formula (II) one or several times, e.g. two or three times. For example, two structural units according to formula (II) may be linked to each other via a bridging group such as an alkylene group.

Ar may be an aryl group which is substituted with at least one C4- to C30-hydrocarbyl group, more preferably C4- to C30-alkyl group.

Aryl group Ar preferably is a phenyl group, a naphthalene group or an aromatic group comprising three fused rings such as phenantrene and anthracene.

Preferably, in formula (II) x is 1, 2 or 3, and more preferably x is 1 or 2.

Furthermore, preferably the compound used as organic aromatic sulphonic acid cross-linking catalyst has from 10 to 200 C-atoms, more preferably from 14 to 100 C-atoms.

In one preferred embodiment, Ar is a hydrocarbyl substituted aryl group and the total compound containing 14 to 28 carbon atoms, and still further preferred, the Ar group is a hydrocarbyl substituted benzene or naphthalene ring, the hydrocarbyl radical or radicals containing 8 to 20 carbon atoms in the benzene case and 4 to 18 atoms in the naphthalene It is further preferred that the hydrocarbyl radical is an alkyl substituent having 10 to 18 carbon atoms and still more preferred that the alkyl substituent contains 12 carbon atoms and is selected from dodecyl and tetrapropyl. Due to commercial availability it is most preferred that the aryl group is a benzene substituted group with an alkyl substituent containing 12 carbon atoms.

The currently most preferred compounds are dodecyl benzene sulphonic acid and tetrapropyl benzene sulphonic acid.

The cross-linking catalyst may also be precursor of the sulphonic acid compound, including all its preferred embodiments mentioned, i.e. a compound that is converted by hydrolysis to such a compound. Such a precursor is for example the acid anhydride of a sulphonic acid compound, or a sulphonic acid that has been provided with a hydrolysable protective group, as e.g. an acetyl group, which can be removed by hydrolysis.

The sulphonic acid cross-linking catalyst may be selected from those as described in EP 1 309 631 and EP 1 309 632, namely a) a compound selected from the group of (i) an alkylated naphthalene monosulphonic acid substituted with 1 to 4 alkyl groups wherein each alkyl group is a linear or branched alkyl with 5 to 40 carbons with each alkyl group being the same or different and wherein the total number of carbons in the alkyl groups is in the range of 20 to 80 carbons;

(ii) an arylalkyl sulphonic acid wherein the aryl is phenyl or naphthyl and is substituted with 1 to 4 alkyl groups wherein each alkyl group is a linear or branched alkyl with 5 to 40 carbons with each alkyl group being the same or different and wherein the total number of carbons in the alkyl groups is in the range of 12 to 80;

(iii) a derivative of (i) or (ii) selected from the group consisting of an anhydride, an ester, an acetylate, an epoxy blocked ester and an amine salt thereof which is hydrolysable to the corresponding alkyl naphthalene monosulphonic acid or the arylalkyl sulphonic acid;

(iv) a metal salt of (i) or (ii) wherein the metal ion is selected from the group consisting of copper, aluminum, tin and zinc; and b) a compound selected from the group of (i) an alkylated aryl disulphonic acid selected from the group consisting of the structure (III):

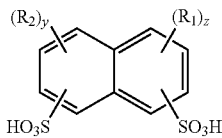

and the structure (IV):

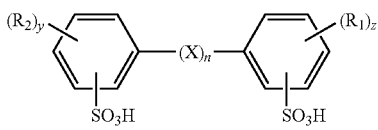

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1 to 4 carbons and n is 1; —C(═O)— wherein n is 1; —S—, wherein n is 1 to 3 and —S(O)$_2$—, wherein n is 1; and (ii) a derivative of (i) selected from the group consisting of the anhydrides, esters, epoxy blocked sulphonic acid esters, acetylates, and amine salts thereof which is a hydrolysable to the alkylated aryl disulphonic acid, together with all preferred embodiments of those sulphonic acids as described in the mentioned European Patents.

Another cross-linking catalyst that may be used according to the present invention is a tin catalyst. The tin catalyst can be in the form of dioctyltin and dibutyltin diacetylacetonate or dibutyltin and dioctyltin dilaurate.

Preferably, in the polyolefin composition according to the invention the cross-linking catalyst is present in an amount of 0.0001 to 6 wt %, more preferably of 0.001 to 6 wt %, and most preferably 0.02 to 5 wt %.

The cross-linking catalyst may be added to the silane group containing polyolefin by compounding the polymer with a so-called master batch, in which the catalyst, and optionally further additives are contained in a polymer, e.g. polyolefin, matrix in concentrated form.

The matrix polymer may be a polyolefin, more preferably a polyethylene, which may be a homo- or copolymer of ethylene, e.g. low density polyethylene, or polyethylene-methyl-ethyl-butyl-acrylate copolymer containing 1 to 50 wt % of the acrylate, and mixtures thereof.

As stated, in the master batch the compounds to be added to the silane group containing polyolefin are contained in concentrated form, i.e. in a much higher amount than in the final composition.

The master batch preferably comprises cross-linking catalyst (B) in an amount of from 0.3 to 6 wt %, more preferably from 0.7 to 3.5 wt %.

The master batch may be processed with the silane group containing polymer in an amount of from 1 to 10 wt %, more preferably from 2 to 8 wt %.

The composition of the present invention comprises a crosslinkable polyolefin comprising hydrolysable silane groups (A). More preferably the cross-linkable polyolefin comprises, still more preferably consists of, a polyethylene containing hydrolysable silane groups.

The hydrolysable silane groups may be introduced into the polyolefin by copolymerization of e.g. ethylene monomers with silane group containing comonomers, the technique well known in the art.

Preferably, the silane group containing polyolefin has been obtained by copolymerization. In the case of polyolefins, preferably polyethylene, the copolymerization is preferably carried out with an unsaturated silane compound represented by the formula $$R^1SiR^2_qY_{3-q} \qquad (V)$$

wherein $R^1$ is an ethylenically unsaturated hydrocarbyl, hydrocarbyloxy or (meth)acryloxy hydrocarbyl group, $R^2$ is an aliphatic saturated hydrocarbyl group, Y which may be the same or different, is a hydrolysable organic group and q is 0, 1 or 2.

Special examples of the unsaturated silane compound are those wherein $R^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and $R^2$, if present, is a methyl, ethyl, propyl, decyl or phenyl group.

A preferred unsaturated silane compound is represented by the formula $$CH_2=CHSi(OA)_3 \qquad (VI)$$

wherein A is a hydrocarbyl group having 1-8 carbon atoms, preferably 1-4 carbon atoms.

The most preferred compounds are vinyl trimethoxysilane, vinyl bismethoxyethoxysilane, vinyl triethoxysilane, gamma-(meth)acryloxypropyltrimethoxysilane, gamma (meth)acryloxypropyltriethoxysilane, and vinyl triacetoxysilane.

The cross-linkable polyolefin comprising hydrolysable silane groups (A) may contain 0.001 to 15 wt % of the silane compound, preferably 0.01 to 5 wt %, more preferably 1-3 wt % of the silane compound.

The copolymerization of the olefin, e.g. ethylene, and the unsaturated silane compound may be carried out under any suitable conditions resulting in the copolymerization of the two monomers.

Polyolefin composition according to the present invention further comprises a polar comonomer (C). Such a polar comonomer (C) may be selected from: (a) vinyl carboxylate esters, such as vinyl acetate and vinyl pivalate, (b) alpha-olefins, such as propene, 1-butene, 1-hexane, 1-octene and 4-methyl-1-pentene, (c) (meth)acrylates, such as methyl (meth)acrylate, ethyl(meth)acrylate and butyl(meth)acrylate, (d) olefinically unsaturated carboxylic acids, such as (meth)acrylic acid, maleic acid and fumaric acid, (e) (meth) acrylic acid derivatives, such as (meth)acrylonitrile and (meth)acrylic amide, (f) vinyl ethers, such as vinyl methyl ether and vinyl phenyl ether, and (g) aromatic vinyl compounds, such as styrene and alpha-ethyl styrene.

Amongst these comonomers, vinyl esters of monocarboxylic acids having 1-4 carbon atoms, such as vinyl acetate, and (meth)acrylate of alcohols having 1-4 carbon atoms, such as methyl(meth)-acrylate, are preferred.

Especially preferred comonomers are butyl acrylate, ethyl acrylate and methyl acrylate.

The content of the polar comonomer (C) in the polyolefin composition according to the present invention may be 5-35 wt %, preferably 19-32 wt %, more preferably 20-31 wt %, and most preferably 21-30 wt %.

The terpolymer according to the present invention may comprise further comonomers.

Two or more such olefinically unsaturated compounds may be used in combination. The term "(meth)acrylic acid" is intended to embrace both acrylic acid and methacrylic acid.

The polyolefin composition according to the invention may further contain various additives, such as miscible thermoplastics, antioxidants, further stabilizers, fillers, coloring agents and foaming agents.

Possible antioxidants are disclosed in EP 1 254 923. Such antioxidants are particularly suitable for stabilization of polyolefins containing hydrolysable silane groups which are crosslinked with a cross-linking catalyst, in particular an acidic cross-linking catalyst. Other preferred antioxidants are disclosed in WO2005003199A1. The antioxidant may be present in the composition in an amount of from 0.01 to 3 wt %, more preferably 0.05 to 2 wt %, and most preferably 0.08 to 1.5 wt %.

Further, the polyolefin composition may optionally include one or more fillers, such as reinforcement fillers that may be added to the silane-crosslinkable polyolefin elastomer include glass fibers, short aramid fibers, carbon nanowires, carbon nanotubes, nano silica, nano clays, graphene, nano platelets, and varieties of carbon allotropes.

In some aspects, the filler(s) may include metal oxides, metal hydroxides, metal carbonates, metal sulfates, metal silicates, clays, talcs, carbon black, and silicas.

Depending on the application and/or desired properties, these materials may be fumed or calcined.

The filler(s) may be present in an amount of from greater than 0 wt % to about 50 wt %, including from about 1 wt % to about 20 wt %, and from about 3 wt % to about 10 wt %.

The silane-crosslinked polyolefin elastomer and/or the respective articles formed may also include waxes (e.g., paraffin waxes, microcrystalline waxes, HDPE waxes, LDPE waxes, thermally degraded waxes, byproduct polyethylene waxes, optionally oxidized Fischer-Tropsch waxes, and functionalized waxes). In some embodiments, the wax(es) are present in an amount of from about 0 wt % to about 10 wt %.

Tackifying resins (e.g., aliphatic hydrocarbons, aromatic hydrocarbons, modified hydrocarbons, terpens, modified terpenes, hydrogenated terpenes, rosins, rosin derivatives, hydrogenated rosins, and mixtures thereof) may also be included in the silane-crosslinker polyolefin elastomer/blend. The tackifying resins may have a ring and ball softening point in the range of from 70° C. to about 150° C. and a viscosity of less than about 3,000 cP at 177° C. In some aspects, the tackifying resin(s) are present in an amount of from about 0 wt % to about 10 wt %.

In some aspects, the polyolefin composition may include one or more oils. Non-limiting types of oils include white paraffinic oils, mineral oils, and/or naphthenic oils. In some embodiments, the oil(s) are present in an amount of from about 0 wt % to about 10 wt %.

In some aspects, the silane-crosslinked polyolefin elastomer may include one or more filler polyolefins having a crystallinity greater than 20%, greater than 30%, greater than 40%, or greater than 50%. The filler polyolefin may include polypropylene, poly(ethylene-co-propylene), and/or other ethylene/a-olefin copolymers. In some aspects, the use of the filler polyolefin may be present in an amount of from about 5 wt % to about 60 wt %, from about 10 wt % to about 50 wt %, from about 20 wt % to about 40 wt %, or from about 5 wt % to about 20 wt %. The addition of the filler polyolefin may increase the Young's modulus by at least 10%, by at least 25%, or by at least 50% for the final silane-crosslinked polyolefin elastomer.

The polyolefin composition according to the present invention may be foamed. The foaming agent can be a chemical foaming agent (e.g., organic or inorganic foaming agent) and/or a physical foaming (e.g., gases and volatile low weight molecules) that is added to the cross-linkable polyolefin and condensation catalyst blend during the extrusion and/or molding process to produce the foamed or polyolefin composition.

In some aspects, an endothermic blowing (foaming) agent may be used that can include, for example, sodium bicarbonate and/or citric acid and its salts or derivatives.

Exemplary citric acid foaming agents include those sold under the trade name HYDROCEROL® that includes a mixture of zinc stearate, polyethylene glycol, and a citric acid or citric acid derivative. The desired decomposition temperature for the endothermic blowing (foaming) agent may be from about 160° C. to about 200° C., or about 175° C., about 180° C., about 185° C., about 190° C., or about 195° C.

Organic foaming agents that may be used can include, for example, azocompounds, such as azodicarbonamide (ADCA), barium azodicarboxylate, azobisisobutyronitrile (AIBN), azocyclohexylnitrile, and azodiaminobenzene, N-nitrosocompounds, such as N,N'-dinitrosopentamethyl-enetetramine (DPT), N,N'-dimethyl-N,N'dinitrosoterephtha-lamide, and trinitrosotrimethyltriamine, hydrazide compounds, such as 4,4'-oxybis(benzenesulfonylhydrazide) (OBSH), paratoluene sulfonylhydrazide, diphenylsulfone-3, 3'-disulfonylhydrazide, 2,4-toluenedisulfonylhydrazide, p,pbis(benzenesulfonylhydrazide)ether, benzene-1,3-disulfonylhydrazide, and allylbis(sulfonylhydrazide), semicarbazide compounds, such asptoluilenesulfonylsemicarbazide, and 4,4'-oxybis(benzenesulfonylsemicarbazide), alkane-fluorides, such as trichloromonofluoromethane, and dichloromonofluoromethane, and triazole compounds, such as 5-morpholyl-1,2,3,4-thiatriazole, and other known organic foaming agents. Preferably, azo compounds and N-nitroso compounds are used.

Further preferably, azodicarbonamide (ADCA) and N,N'dinitrosopentamethylenetetramine (DPT) are used. The organic foaming agents listed above may be used alone or in any combination of two or more.

The decomposition temperature and amount of organic foaming agent used can have important consequences on the density and material properties of the foamed silane-crosslinked polyolefin elastomer. In some aspects, the organic foaming agent has a decomposition temperature of from about 150° C. to about 210° C. The organic foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based on the total weight of the polymer blend. If the organic foaming agent has a decomposition temperature lower than 150° C., early foaming may occur during compounding. Meanwhile, if the organic foaming agent has a decomposition temperature higher than 210° C., it may take longer, e.g., greater than 15 minutes, to mold the foam, resulting in low productivity. Additional foaming agents may include any compound whose decomposition temperature is within the range defined above.

The density of the foamed polyolefin composition according to the present invention may be below 0.7 g/cm$^3$, below 0.6 g/cm$^3$, or below 0.5 g/cm$^3$.

The inorganic foaming agents that may be used include, for example, hydrogen carbonate, such as sodium hydrogen carbonate, and ammonium hydrogen carbonate, carbonate, such as sodium carbonate, and ammonium carbonate, nitrite, such as sodium nitrite, and ammonium nitrite, borohydride, such as sodium borohydride, and other known inorganic foaming agents, such as azides. In some aspect, hydrogen carbonate may be used. In other aspects, sodium hydrogen carbonate may be used. The inorganic foaming agents listed above may be used alone or in any combination of two or more. The inorganic foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based on the total weight of the polymer blend.

Physical blowing agents that may be used include, for example, super supercritical carbon dioxide, supercritical nitrogen, butane, pentane, isopentane, cyclopentane. In some aspects, various minerals or inorganic compounds (e.g., talc) may be used as a nucleating agent for the supercritical fluid. The physical foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based the total weight of the polymer blend.

The polyolefin composition according to the present invention may be used for manufacturing of hoses. The method of manufacturing of hoses may include the following steps: extruding the terpolymer, the cross-linking catalyst and the silicone containing compound, and optionally a filler together to form an extruded crosslinkable polyolefin composition; cooling the extruded crosslinkable polyolefin composition; forming the extruded crosslinkable polyolefin composition into a hose element; and crosslinking the composition of the hose element to form the hose.

The polyolefin composition according to the present invention may be used for manufacturing of roofing membranes. The single ply roofing membrane may include a top layer and a bottom layer comprising a flame retardant and the polyolefin composition according to the present invention; a scrim layer arranged there between. According to another aspect of the present disclosure, a method of making a single ply roofing membrane is provided. The method includes: extruding the polyolefin composition to form a top layer and a bottom layer; calendaring a scrim layer between the top and the bottom layers to form an uncured roofing membrane element; and crosslinking the polyolefin composition of the top and the bottom layers in the uncured roofing membrane element at a curing temperature and a curing humidity to form the single ply roofing membrane.

The scrim layer disposed between the top and bottom layers can serve as a reinforcement in the roofing membrane, thus adding to its structural integrity. Materials that can be used for the scrim layers may include, for example, woven and/or non-woven fabrics, fiberglass, and/or polyester. In some aspects, additional materials that can be used for the scrim layers can include synthetic materials such as polyaramids, KEVLAR™, TWARON™, polyamides, polyesters, RAYON™, NOMEX™, TECH NORA™, or a combination thereof. In some aspects, the scrim layer may include aramids, polyamides, and/or polyesters. In some aspects, a tenacity of the scrim layer may range from about 100 to about 3000 denier. In other aspects, the scrim layers may have a tenacity ranging from about 500 to about 1500 denier. In still other aspects, scrim layers may have a tenacity of about 1000 denier. In some aspects, crim layers may have a tensile strength of greater than about 14 kN per meter {80 pounds force per inch). In other aspects, the scrim layers may have a tensile strength of greater than about 10 kN per meter, greater than about 15 kN per meter, greater than about 20 kN per meter, or greater than about 25 kN per meter. Depending on the desired properties of the final single ply roofing membrane, the scrim layers may be varied as needed to suit particular roofing membrane designs. One of ordinary skill in the art would appreciate that such characteristics can be varied without departing from the present disclosure.

The single ply roofing membranes disclosed herein may have a variety of different dimensions. In some aspects, single ply roofing membranes may have a length from about 30 feet to about 200 feet and a width from about 4 feet to about 12 feet. In some aspects, the roofing membranes 10 may have a width of about 10 feet. Variations in the width may provide for various advantages. For example, in some aspects, roofing membranes 10 having smaller widths may advantageously allow for greater ease in assembly of a roofing structure. Smaller widths may also advantageously allow for greater ease in rolling or packaging of a manufactured membrane. Larger widths may advantageously allow for greater structure integrity, fast installation and/or improve the stability of a roofing structure comprising these membranes.

Numerous different flame retardants may be used in combination with the polyolefin composition employed in the top and bottom layers of the roofing membrane. For example, magnesium hydroxide may provide flame retardant properties in the layers. The flame retardant may be present in the amount of between about 20 wt % and 75 wt % of the roofing membrane composition.

The polyolefin composition according to the present invention may be used for manufacturing of shoe soles. The method for manufacturing shoe soles includes: extruding the polyolefin composition of the present invention and a foaming agent to form a cross-linkable polyolefin blend; injection or compression molding the crosslinkable polyolefin blend into a shoe sole element; and crosslinking the crosslinkable polyolefin blend at a temperature greater than 150° C. and an ambient humidity to form a shoe sole.

The composition of the present invention may exhibit the compression set of 18-30%, preferably 18.1-25% at 23° C. Further, the composition of the present invention may exhibit the compression set of 5-15%, preferably 6-10% at −25° C. Still further, the composition of the present invention may exhibit the compression set of 15-40%, preferably 18-35%, more preferably 19-34% at 100° C.

Further, the composition according to the present invention may have $MFR_2$ of 1-40 g/10 min, preferably 2-34 g/10 min.

The composition according to the present invention may have Shore A values from 60 to 85, preferably from 61 to 78.

The composition according to the present invention may be produced in a high-pressure reactor.

The present invention further relates to a method of manufacturing a weather seal comprising the polyolefin composition described above. The method may comprise the steps of:

extruding the polyolefin composition into a profile
cutting the extruded profile.

The weather seal profile according to the present invention may comprise portions comprising foamed and non-foamed polyolefin composition.

Prior to the extrusion, the following components may be dry blended in the hopper of the extruder: a cross-linkable polyolefin comprising hydrolysable silane groups, a cross-linking catalyst (2-6 wt %), a polar comonomer, polypropylene (0-10 wt %), carbon black masterbatch containing 40 wt % CB (2-5 wt %), provided that the catalyst masterbatch does not contain carbon black. Further, colour masterbatch including UV stabiliser may be added.

The starting materials disclosed above may be pre-dried at 40° C. The ratio between length L and diameter d of the extruder should be at least 24:1. The extruder speed may be in the range of 30-80 rpm in order to optimize extrudate quality.

The land length of the die should be kept to a minimum, and the flow channels in the die and the head should be streamlined. The die opening is preferably oversized by 7 to 10% for length and width, and by 3 to 5% for thickness depending on material hardness. Drawdown should not exceed 15%.

The melt-temperature should be kept to a minimum. The temperature of the extruder may be 150-200° C., and may not exceed 215° C.

If colour masterbatches are used in the weather seal profiles, such masterbatches should be based on PP- or PE-matrixes.

Finally, the present invention further relates to a weather seal comprising a polyolefin composition as described above.

DETAILED DESCRIPTION OF THE INVENTION

Examples

1. Materials

EPDM is Keltan 4450 obtained from Lanxess. The EPDM rubber compound for producing a seal was based on the present in the art formulation for EPDM seals, carbon black, stearic acid, zinc oxide, paraffin oil, TMTD and CBS accelerators and sulphur.

Santoprene 121-58W175 is a thermoplastic vulcanizate (TPV) obtained from Exxon Mobil.

Santoprene 121-60M200 is a thermoplastic vulcanizate (TPV) obtained from Exxon Mobil.

JSR 1810B is a thermoplastic vulcanizate (TPV) from JSR group.

JSR 1805B is a thermoplastic vulcanizate (TPV) from JSR group.

TP1-TB3 are terpolymers comprising copolymer of ethylene with methyl acrylate comonomer and with vinyl trimethoxysilane comonomer. The properties of TP1-TP3 are shown in Table 1.

TABLE 1

Product properties of the inventive compositions

Properties of the polymer obtained from the reactor

| Polymer | $MFR_2$ (g/10 min) | Acrylate content (wt %) | $T_m$ (° C.) | VTMS content (wt %) |
|---|---|---|---|---|
| TP1 | 2 | 21 | 90 | 2.1 |
| TP2 | 18 | 26 | 85 | 2.1 |
| TP3 | 34 | 30 | 81 | 2 |

Catalyst I is a masterbatch comprising dodecylbenzene sulphonic acid and a silicon containing compound.

Catalyst II is a masterbatch comprising dioctyltin dilaurate and a silicon containing compound.

2. Measuring Methods and Procedures

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR2 of polypropylene is measured at a temperature 230° C. and a load of 2.16 kg. The MFR2 of polyethylene is measured at a temperature 190° C. and a load of 2.16 kg.

Shore A

Shore A measurement is performed according to the ASTM standard D2240.

Gel Content

The gel content was calculated according to ASTM D 2765-01. The gel content was measured from the plaques samples for compression set measurements, see "Sample preparation and compression set".

Content (wt % and mol %) of Polar Comonomer

Comonomer content (wt %) of the polar comonomer was determined in a known manner based on Fourier transform infrared spectroscopy (FTIR) determination calibrated with 13 C-NMR as described in Haslam J, Willis H A, Squirrel D C. Identification and analysis of plastics, 2<nd> ed. London Iliffe books; 1972. FTIR instrument was a Perkin Elmer 2000, Iscann, resolution 4 $cm^{-1}$.

For determination of the comonomers, films with thickness 0.1 mm were prepared. The peak for the used comonomer was compared to the peak of polyethylene as evident for a skilled person (e.g. the peak for butyl acrylate at 3450 $cm^{-1}$ was compared to the peak of polyethylene at 2020 $cm^{-1}$). The weight-% was converted to mol-% by calculation based on the total moles of polymerisable monomers.

VTMS Content in PE-Methylacrylate-Trimethylsiloxane Terpolymer

Quantitative nuclear-magnetic resonance (NMR) spectroscopy was used to quantify the comonomer content of the polymers.

Quantitative 1H NMR spectra recorded in the solution-state using a Bruker Avance III 400 NMR spectrometer operating at 400.15 MHz. All spectra were recorded using a standard broad-band inverse 5 mm probehead at 100° C. using nitrogen gas for all pneumatics. Approximately 100 mg of material was dissolved in approx. 3 ml of 1,2-tetrachloroethane-d2 (TCE-d2) using ditertiarybutylhydroxytoluen (BHT) (CAS 128-37-0) as stabiliser. Standard single-pulse excitation was employed utilising a 30 degree pulse, a relaxation delay of 3 s and no sample rotation. A total of 32 transients were acquired per spectra using 2 dummy scans. A total of 32 k data points were collected per FID with a dwell time of 60 μs, which corresponded to a spectral window of approx. 20 ppm. The FID was then zero filled to 64 k data points and an exponential window function applied with 0.3 Hz line-broadening. This setup was chosen primarily for the high resolution needed for comonomer content quantification.

Quantitative 1H NMR spectra were processed, integrated and quantitative properties determined using custom spectral analysis automation programs. All chemical shifts were internally referenced to the residual protonated solvent signal at 5.95 ppm.

Characteristic signals corresponding to the incorporation of both methyl acrylate and trimethylsiloxane were observed (brandolini01) and all comonomer contents calculated with respect to all other monomers present in the polymer.

Characteristic signals resulting from incorporation of methyl acrylate, in various comonomer sequences, were observed. The methylacrylate incorporation was quantified using the integral of the signal at 3.65 ppm assigned to the 1MA sites, accounting for the number of reporting nuclei per comonomer:

$MA = I_{1MA}/3$

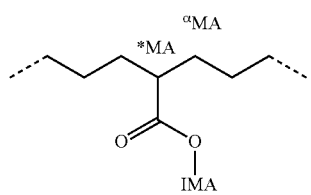

Characteristic signals resulting from incorporation of vinyltrimethylsiloxane, in various comonomer sequences, were observed. The vinyltrimethylsiloxane incorporation was quantified using the integral of the signal at 3.56 ppm assigned to the 1VTMS sites, accounting for the number of reporting nuclei per comonomer:

$VTMS = I_{1VTMS}/9$

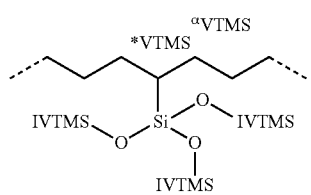

Characteristic signals resulting from the additional use of BHT as stabiliser, were observed. The BHT content was quantified using the integral of the signal at 6.93 ppm assigned to the ArBHT sites, accounting for the number of reporting nuclei per molecule:

$BHT = I_{ArBHT}/2$

The ethylene comonomer content was quantified using the integral of the bulk aliphatic (bulk) signal between 0.00-3.00 ppm. This integral included the *MA and αMA sites from isolated methylacrylate incorporation, the *VTMS and αVTMS sites from isolated vinyltrimethylsiloxane incorporation and the aliphatic sites from BHT as well as the sites from polyethylene sequences. The total ethylene comonomer content was calculated based on the bulk integral and compensating for the observed comonomer sequences and BHT:

$E = (1/4)*[I_{bulk} - 3*MA - 3*VTMS - 21*BHT]$

It should be noted that an insignificant error is introduced due to the inability to compensate for the two saturated chain ends (S) without associated branch sites.

The total mole fractions of methylacrylate and vinyltrimethylsiloxane in the polymer were calculated as:

$fMA = MA/(E + MA + VTMS)$ $fVTMS = VTMS/(E + MA + VTMS)$

The total comonomer incorporations of methylacrylate and vinyltrimethylsiloxane in mole percent were calculated from the mole fractions in the standard manner:

$MA[mol\%] = 100*fMA$ $VTMS[mol\%] = 100*fVTMS$

The total comonomer incorporations of methylacrylate and vinyltrimethylsiloxane in weight percent were calculated from the mole fractions in the standard manner:

$MA[wt\%] = 100*(fMA*86.09)/((fMA*86.09) + (fVTMS*148.23) + ((1 - fMA - fVTMS)*28.05))$ $VTMS[wt\%] = 100*(fVTMS*148.23)/((fMA*86.09) + (fVTMS*148.23) + ((1 - fMA - fVTMS)*28.05))$

Reference is made to A. J. Brandolini, D. D. Hills, "NMR spectra of polymers and polymer additives", Marcel Deker Inc., 2000

Melt Temperature ($T_m$) and Heat of Fusion ($H_f$)

$T_m$ was measured with Mettler TA820 differential scanning calorimetry (DSC) on 5 to 10 mg samples. DSC is run according to ISO 3146/part 3/method C2 in a heat/cool/heat cycle with a scan rate of 10° C./min (heating and cooling) in the temperature range of +23 to +210° C. The melting temperature and heat of fusion ($H_f$) are determined from the second heating step. The melting temperatures were taken as the peaks of endotherms.

Preparation of TP1-TP3

TP1-TP3 were produced in a commercial high pressure tubular reactor at a pressure 2500-3000 bar and max temperature 250-300° C. using conventional peroxide initiator. Ethylene monomer, methyl acrylate (MA) polar comonomer and vinyl trimethoxy silane (VTMS) comonomer (silane group(s) containing comonomer) were added to the reactor system in a conventional manner. CTA was used to regulate MFR as well known for a skilled person.

Sample Preparation and Compression Set

The sample preparation for compression set measurement at DIK was done the following:

The tested materials were dry blended (mixed) with two different catalyst masterbatches, a 5% catalyst I and 4% catalyst II and then extruded into tapes. Tape samples were produced on a Collin extruder (Teach-Line E20T) with a temperature profile of 120-130-140° C. The tape samples had a thickness of 2 mm and a width of 40 mm.

Plaques samples for compression set were made by compression moulding the tapes to get a thickness of around 6 mm for the compression set test. After compression moulding the plaques were merged in hot water (50° C.) for 24 hours to fully crosslink the material before measuring the compression set. The actual specimen is then cut from the plaque and fixed between two metal plates at room temperature.

The compression is set to be 25% of the thickness of the specimen by utilizing different spacers. The compressed samples are then stored at the selected temperature for 24 hours. Thereafter, the samples are moved to room temperature and released from compression. After 30 minutes of recovery at room temperature, the samples are measured to determine the compression set. The compression set is measured according to DIN ISO 815-1:2010-09, method A, specimen B.

3. Results

TABLE 2

| Sample | Polymer | Catalyst | EMA (wt %) By NMR | Melt Temperature (° C.) by DSC | VTMS (wt %) by NMR | $MFR_2$ (g/min) | Gel Content (%) | Shore A | Compression set (%) −25° C. | 23° C. | 100° C. |
|---|---|---|---|---|---|---|---|---|---|---|---|
| CE1 | EPDM | — | | | | | | | 4 | 8.3 | 53.6 |
| CE2 | Santoprene 121-58W175 | — | | | | | | 62 | | 18 | 39 (125° C.) |
| CE3 | Santoprene 121-60M200 | — | | | | | | 61 | | | 26 (70° C.) 33 (100° C.) |
| CE4 | JSR 1810B | — | | | | | | 80 | 22.4 | 34.6 | 51.3 |
| CE5 | JSR 1805B | — | | | | | | 80 | 20.0 | 32.1 | 64.7 |
| IE1 | TP1 | 5% catalyst I | 21 | 90 | 2.1 | 2 | 91.2 | 82 | 7.6 | 18.9 | 31.0 |
| IE2 | TP1 | 4% catalyst II | 21 | 90 | 2.1 | 2 | 79.2 | 82 | 9.7 | 19.6 | 28.1 |
| IE3 | TP2 | 5% catalyst I | 26 | 85 | 2.1 | 18 | 89.0 | 72 | 6.0 | 18.6 | 19.4 |
| IE4 | TP2 | 4% catalyst II | 26 | 85 | 2.1 | 18 | 77.3 | 72 | 8.7 | 21.8 | 33.1 |
| IE5 | TP3 | 5% catalyst I | 30 | 81 | 2 | 34 | 82.3 | 61 | 7.1 | 18.5 | 21.9 |
| IE6 | TP3 | 4% catalyst II | 30 | 81 | 2 | 34 | 55.3 | 61 | 6.3 | 21.9 | 33.1 |

Ethylene-methyl acrylate-vinyl silane terpolymers with 21-30 w-% methyl acrylate show near as good compression set at −25° C., slightly higher compression set at room temperature and clearly lower compression set at 100° C. compared to EPDM (Table 2) and comparable compression set with Santoprene-based samples at room and high temperatures.

Further, the samples comprising the composition of the present invention clearly show lower compression set values compared to JSR-based samples at all temperatures.

It is believed that the combination of high Shore A and high gel content of the inventive samples is providing the advantageous compression set properties.

Although the present invention has been described with reference to various embodiments, those skilled in the art will recognize that changes may be made without departing from the scope of the invention. It is intended that the detailed description be regarded as illustrative, and that the appended claims including all the equivalents are intended to define the scope of the invention.

The invention claimed is:

1. A polyolefin composition, said composition comprising:
 a terpolymer comprising
 (A) a cross-linkable polyolefin comprising hydrolysable silane groups, and
 (C) a polar comonomer,
 wherein the polar comonomer (C) is present in an amount of 5-35 wt % based on the total amount of the terpolymer,
 wherein said polyolefin composition further comprises:
 (B) a cross-linking catalyst, and
 (D) a silicon containing compound; and
 (E) a foaming agent;
 wherein said composition have Shore A values from 60 to 85; and wherein a compression set of said polyolefin composition is 15-40% at 100° C.

2. The polyolefin composition according to claim 1, wherein the polar comonomer is present in an amount of 20-31 wt %.

3. The polyolefin composition according to claim 1, wherein the polar comonomer is methyl acrylate.

4. The polyolefin composition according to claim 1, wherein said cross-linking catalyst is a Brönsted acid.

5. The polyolefin composition according to claim 1, wherein said cross-linking catalyst is a tin catalyst.

6. The polyolefin composition according to claim 1, wherein said composition have Shore A values from 61 to 82.

7. The polyolefin composition according to claim 1, wherein the compression set of said polyolefin composition is 18-35%, at 100° C.

8. The polyolefin composition according to claim 1, wherein the compression set of said polyolefin composition is 18-30%, at 23° C.

9. The polyolefin composition according to claim 1, wherein the compression set of said polyolefin composition is 5-15% at −25° C.

10. The polyolefin composition according to any one of the preceding claims, wherein $MFR_2$ of said composition is 1-40 g/10 min.

11. The polyolefin composition according to claim 1, wherein said composition further comprises an antioxidant.

12. The polyolefin composition according to claim 1, wherein said composition is produced in a high-pressure reactor.

13. A method of manufacturing a weather seal comprising the polyolefin composition according to claim 1, said method comprising the steps of:
    extruding the polyolefin composition according to claim 1 into a profile
    cutting the extruded profile.

14. A weather seal comprising a polyolefin composition according to claim 1.

15. A method of manufacturing a roofing membrane comprising the polyolefin composition according to claim 1, said method comprising the steps of:
    extruding the polyolefin composition according to claim 1 to form a top layer and a bottom layer;
    calendaring a scrim layer between the top and the bottom layers to form an uncured roofing membrane element; and
    crosslinking the polyolefin composition of the top and the bottom layers in the uncured roofing membrane element at a curing temperature and a curing humidity to form the single ply roofing membrane.

16. A roofing membrane comprising a polyolefin composition according to claim 1.

17. A method of manufacturing a shoe sole comprising the polyolefin composition according to claim 1, said method comprising the steps of:
    extruding the polyolefin composition according to claim 1 and a foaming agent to form a cross-linkable polyolefin blend;
    injection or compression moulding the crosslinkable polyolefin blend into a shoe sole element; and
    crosslinking the crosslinkable polyolefin blend at a temperature greater than 150° C. and an ambient humidity to form a shoe sole.

18. A shoe sole comprising a polyolefin composition according to claim 1.

19. A method of manufacturing a hose comprising the polyolefin composition according to claim 1, said method comprising the steps of:
    extruding the terpolymer, the cross-linking catalyst and the silicone containing compound, and optionally a filler together to form an extruded crosslinkable polyolefin composition;
    cooling the extruded crosslinkable polyolefin composition;
    forming the extruded crosslinkable polyolefin composition into a hose element; and
    crosslinking the composition of the hose element to form the hose.

20. A hose comprising a polyolefin composition according to claim 1.

* * * * *